United States Patent [19]

Luh

[11] Patent Number: 6,086,507

[45] Date of Patent: Jul. 11, 2000

[54] DEVICE AND METHOD FOR ADJUSTING THE RATIO OF TRANSMISSION IN A CVT

[75] Inventor: Joachim Luh, Bietigheim-Bissingen, Germany

[73] Assignee: Robert Bosch GmbH, Stuttgart, Germany

[21] Appl. No.: 09/269,887

[22] PCT Filed: Jun. 26, 1998

[86] PCT No.: PCT/DE98/01756

§ 371 Date: Apr. 2, 1999

§ 102(e) Date: Apr. 2, 1999

[87] PCT Pub. No.: WO99/07572

PCT Pub. Date: Feb. 18, 1999

[30] Foreign Application Priority Data

Aug. 6, 1997 [DE] Germany .......................... 197 33 960

[51] Int. Cl.[7] ................................................. B60K 41/12
[52] U.S. Cl. ............................................... 477/48; 701/51
[58] Field of Search ........................ 477/46, 48; 701/51, 701/61

[56] References Cited

U.S. PATENT DOCUMENTS

| 4,590,561 | 5/1986 | Abo et al. . |
| 4,597,308 | 7/1986 | Tanaka et al. . |
| 4,689,745 | 8/1987 | Itoh et al. ............................. 477/48 X |
| 4,803,900 | 2/1989 | Ohkumo ................................ 477/46 X |
| 5,257,960 | 11/1993 | Sato . |
| 5,600,557 | 2/1997 | Ogawa . |
| 5,730,680 | 3/1998 | Toukura ..................................... 477/46 |
| 5,871,416 | 2/1999 | Sawada et al. ........................ 477/48 X |

FOREIGN PATENT DOCUMENTS

| 0118922 | 9/1984 | European Pat. Off. . |
| 0210663 | 2/1987 | European Pat. Off. . |
| 2340487 | 9/1977 | France . |
| 4411628 | 10/1995 | Germany . |

Primary Examiner—Charles A. Marmor
Assistant Examiner—Roger Pang
Attorney, Agent, or Firm—Walter Ottesen

[57] ABSTRACT

The invention proceeds from an arrangement or a method for adjusting the transmission ratio of a continuously variable belt transmission having a drive end and an output end. The drive end and the output end have at least one axially displaceable element which has essentially the form of a conical disc. Via sensor means, an rpm signal is detected, which represents the rotational movement of the drive end or the output end, and, on the other hand, a displacement signal is detected which represents the axial displacement of at least one of the axially displaceable elements. The essence of the invention is that means for adjusting the transmission ratio are provided with the aid of which the adjustment takes place at least in dependence upon the detected displacement signal. An advantage of the invention is that, in this way, the possibility is provided to save one rpm sensor. Furthermore, and as shown in the course of the description in greater detail, the total transmission ratio adjustment is substantially independent of the engine load or of the drive torque acting in the drive train.

8 Claims, 5 Drawing Sheets

6,086,507

DEVICE AND METHOD FOR ADJUSTING THE RATIO OF TRANSMISSION IN A CVT

FIELD OF THE INVENTION

The invention proceeds from an arrangement and a method for automatically adjusting the transmission ratio of a continuously variable transmission.

BACKGROUND OF THE INVENTION

Continuously variable vehicle transmissions are, for example, known from EP, A1, 0 451 887. Here, the rpms of the drive end (primary end) and the output end (secondary end) are measured by two rpm sensors for adjusting or shifting the transmission ratio. The transmission ratio which is to be adjusted or is adjusted is determined from these sensor signals.

A belt transmission, which is continuously adjustable with respect to its transmission ratio, having a drive end and output end is known from DE, A1, 44 11 628. The drive end and output end have at least one axially displaceable element which has essentially the form of a conical disc. The belt part is, in general, put in place as a band, preferably a thrust element band or a belt or a chain between disc pairs which define the drive end and the output end.

To control the slip of the belt part, the axial displacement of at least one of the axially displaceable elements as well as the rpms of the drive end and the output end are detected. The output signal of a single sensor is evaluated for the rpm detection of one of the two ends as well as for the detection of the axial displacement on this end.

SUMMARY OF THE INVENTION

The object of the present invention is to adjust, as precisely as possible, the transmission ratio of a continuous transmission in all operating regions in a simple and cost-effective manner.

As already mentioned, the invention proceeds from an arrangement and a method for adjusting the transmission ratio of a continuously adjustable belt transmission having a drive end and an output end. The drive end and the output end have at least one axially displaceable element which essentially has the form of a conical disc. On the one hand, an rpm signal, which represents the rotational movement of the drive end or the output end, is detected by sensor means and, on the other hand, a displacement signal is detected which represents the axial displacement of at least one of the elements which are axially displaceable.

The essence of the invention is that means for adjusting the transmission ratio are provided by means of which the adjustment takes place at least in dependence upon the detected displacement signal.

An advantage of the invention is that the possibility is hereby given to be able to omit an rpm sensor. Furthermore, and as will be shown more precisely in the course of the description, the entire transmission ratio adjustment is substantially independent of the engine load or of the drive torque operating on the drive train.

In an especially advantageous first embodiment of the invention, it is provided that the means for adjusting the transmission ratio are so configured that the adjustment takes place in dependence upon the detected rpm signal which represents the rotational movement of the drive end and in dependence upon the detected displacement signal which represents the axial displacement of one of the elements which is axially displaceable on the drive end.

Here, it can be especially provided that the adjustment of the transmission ratio takes place without a rotational movement of the output end detected directly by a sensor. In this embodiment, the axial displacement and the drive rpm are applied to adjust the transmission ratio. Compared to the transmission ratio adjustment, which considers also the output rpm, the adjustment of the transmission ratio for a low longitudinal vehicle speed is hereby advantageously more precise because, in this operating range, the drive rpm is in general greater than the output rpm.

In this first embodiment, it can be provided that, in dependence upon the detected rpm signal, which represents the rotational movement of the drive end and the detected signal, which represents the axial displacement of an axially displaceable element which is arranged on the drive end, the rotational movement of the output end and/or the actual transmission ratio is determined.

As an alternative to the above, a second embodiment can be provided wherein the adjustment of the transmission ratio takes place in dependence upon the detected rpm signal, which represents the rotational movement of the output end, and in dependence upon the detected displacement signal, which represents the axial displacement of one of the elements which is axially displaceable and arranged on the output end. Here, it can be especially provided that the adjustment of the transmission ratio takes place without considering a rotational movement of the drive end detected directly by a sensor.

With this second embodiment, it can be provided that the rotational movement of the drive end and/or the actual transmission ratio is determined in dependence upon the detected rpm signal, which represents the rotational movement of the output end, and the detected displacement signal which represents the axial displacement of an axially displaceable element which is arranged on the output end.

In an especially advantageous embodiment, it is provided that the sensor means are so configured that the output signal of a single sensor is evaluated to detect the rotational movement and to detect the axial displacement.

For the advantageous adaptation or adaption to assembly tolerances, manufacturing tolerances and/or deterioration tolerances of the sensor means, it can be provided that, for adjusting the transmission ratio, a corrective value is determined in dependence upon a displacement signal, which is detected with the presence of a pregivable state of the transmission. The detected displacement signal and/or the quantities derived from the detected displacement signal are modified in dependence upon the determined corrective value.

The pregivable state, which is needed for the above-described adaptation, can be detected as being present when it is detected that the transmission assumes its maximum or minimum transmission ratio. Here, it is especially provided that:
- at least one valve is actuated for the hydraulic displacement of the axially displaceable element and the detection of the maximum or minimum transmission ratio takes place in dependence upon the actuation of the at least one valve and/or in dependence upon the detected hydraulic pressure; and/or,
- the detection of the maximum or minimum transmission ratio takes place in dependence upon the time-dependent change of the detected displacement signal; and/or,
- the detection of the maximum or minimum transmission ratio takes place in dependence upon the detected position of the accelerator pedal actuated by the driver.

Furthermore, it is advantageously provided that the means for adjusting the transmission ratio are so configured that the adjustment of the transmission ratio takes place via a control of the displacement of the axially displaceable elements to a determined desired value. It is especially provided that the desired value is determined in dependence upon the detected displacement signal and in dependence upon the detected rotation movement. This configuration affords the advantage that the oscillation amplitude of the actuating signal for the transmission ratio adjustment is significantly reduced.

It is especially advantageous when the adjustment of the transmission ratio takes place via a control of the displacement of the axially displaceable elements to a determined desired value wherein:

the rotational movement of the output end is determined from the detected displacement signal of the drive end and the detected rpm signal of the drive end;

a desired value for the rotational movement of the drive end is formed from the detected rpm signal of the drive end, the detected rotational movement of the output end, and the detected position of the accelerator pedal actuated by the driver; and, a desired value for the displacement of the axially displaceable elements is determined in dependence upon the determined desired value for the rotational movement of the drive end and the detected rpm signal of the drive end.

BRIEF DESCRIPTION OF THE DRAWINGS

The invention will now be described with respect to the drawings wherein:

FIG. 1 shows an overview of a continuously adjustable transmission; whereas,

DESCRIPTION OF THE PREFERRED EMBODIMENTS OF THE INVENTION

Figure 1:
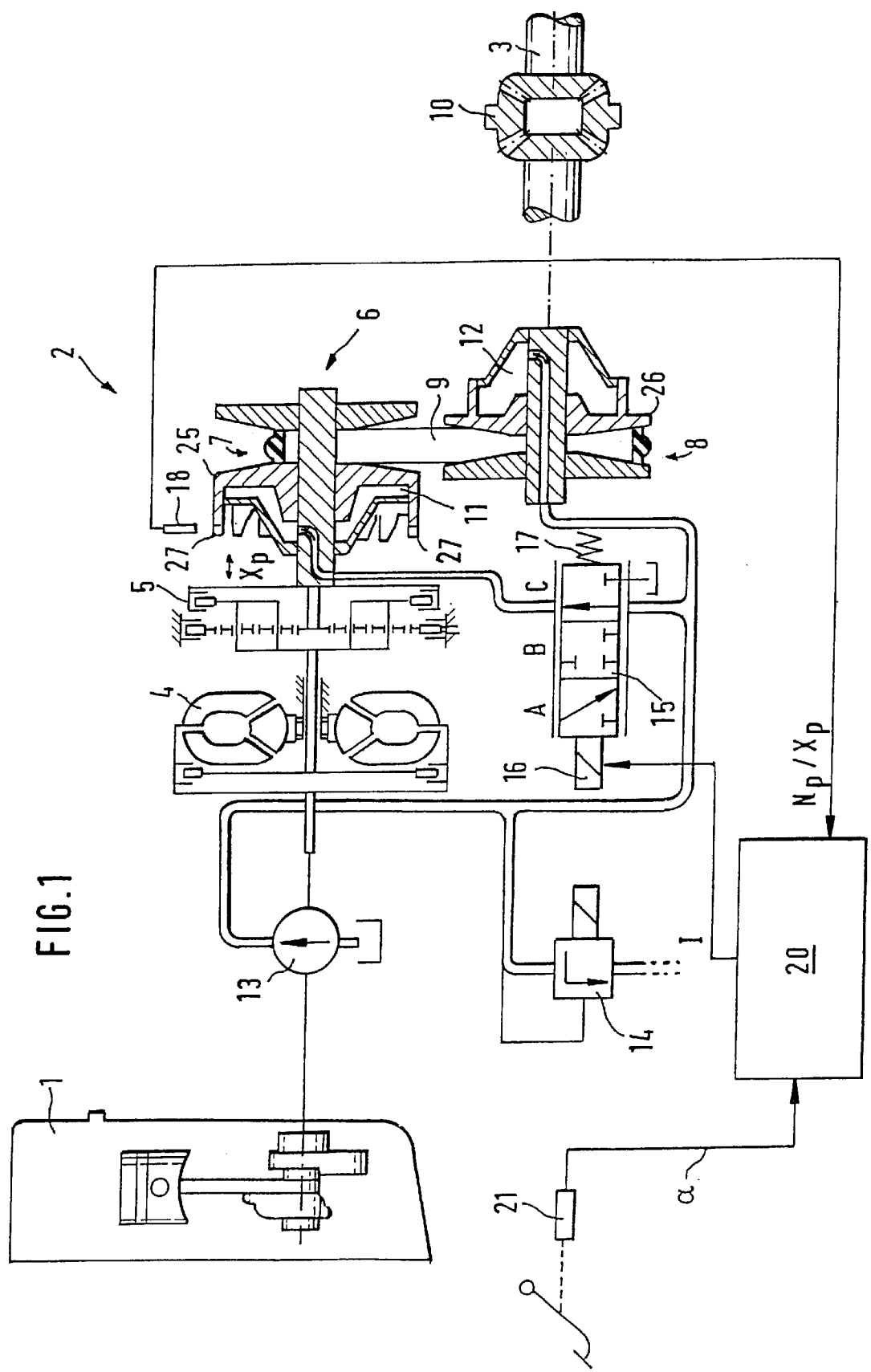

The invention will now be explained in greater detail with respect to embodiments. In FIG. 1, reference numeral 2 identifies a continuously variable belt transmission in motor vehicles for transmitting the force of the engine 1 to the drive shafts 3 of the wheels. Such a continuously variable transmission has, for example, a torque converter 4 and clutches 5 for shifting between forward driving and rearward driving. The torque converter 4 and the clutches 5 are arranged between the engine 1 and the variator 6. The variator 6 comprises a drive-end (primary) conical disc unit 7 and an output-end (secondary) conical disc unit 8 having the axially displaceable conical discs 25 and 26, respectively. The force from the drive disc unit 7 is transmitted to the output disc unit 8 with the aid of a chain or a thrust member band 9. Each conical disc unit comprises an axially stationary disc and an axially movable disc. With a simultaneous variation of the axially movable discs on the drive disc and output disc units, the transmission ratio of the variator 6 changes from a high starting transmission ratio "low" to a low transmission ratio "overdrive".

The output disc unit is connected via a compensating transmission 10 to the drive shafts 3 of the wheels. The axially movable conical discs 25 and 26 are hydraulically adjustable and have for this purpose oil chambers 11 and 12.

The transmission has an oil pump 13 for the pressure oil supply. The oil pump 13 runs, for example, at the rpm of the engine 1. In one possible embodiment, the tension of the belt 9 is adjusted with the aid of a pressure-limiting valve 14 which regulates the pressure in the output end oil chamber 12. The transmission ratio is adjusted with the aid of a proportional valve (primary valve) 15 at the primary end.

This primary valve 15 can release oil from the drive-end oil chamber 11 when in the position A and thereby reduce the pressure whereby the transmission ratio is adjusted to low. In the position C, oil flows into the drive-end oil chamber 11 whereby the transmission ratio is changed in the direction of overdrive and the pressure of the drive-end oil chamber 11 increases. In the position B of the proportional valve 15, the oil chamber 11 is sealed; that is, virtually no oil can flow in or out of the oil chamber 11. The proportional valve 15 can, for example, be directly controlled or it can be driven by a precontrol valve in a manner known per se.

In the embodiment described here, a force can be generated on the valve actuator by adjusting a current I in the magnet 16. A specific position of the proportional valve 15 adjusts because of the spring 17 present on the valve actuator. This means that the current I through the magnet 16 determines the position of the proportional valve 15 and therefore the opening cross section of the valve.

Figure 7:
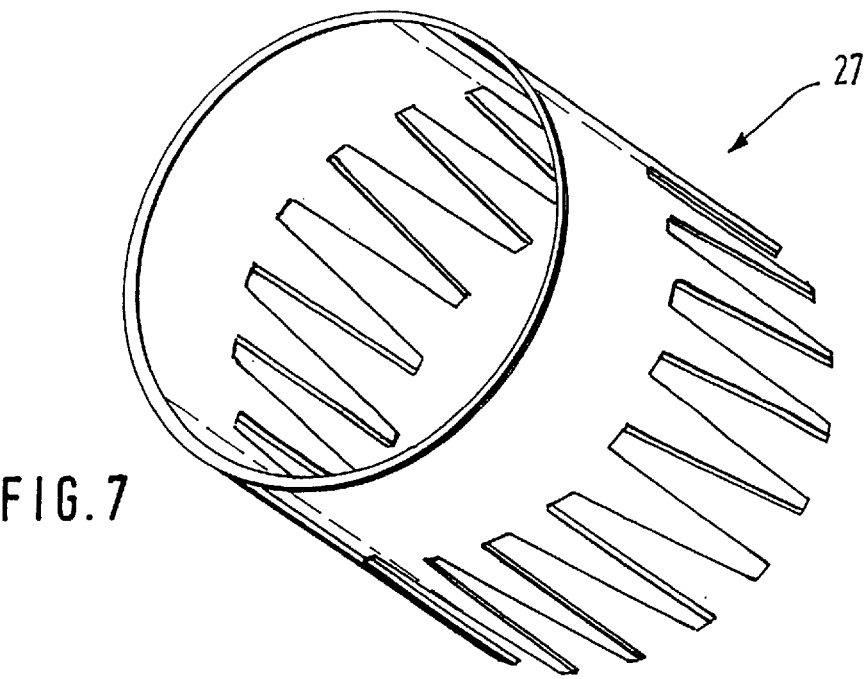
FIG. 7 shows a part of the combination sensor for detecting the rpm and the axial displacement.

Furthermore, an rpm transducer 18 is provided which detects the primary rpm $N_p$ and simultaneously the axial displacement $X_p$ of S the movable conical disc 25. For this purpose, a transducer wheel 27 is connected to the axially displaceable primary-end conical disc 25. The transducer wheel 27 has a special toothed profile, for example, in the form of a sawtooth pattern, so that for an axial displacement of the movable conical disc, the pulsewidth duration of the rpm signal, which is detected by the rpm transducer 18, is changed. FIG. 7 shows, as an example, such a transducer wheel which is configured as a sleeve having a sawtooth profile. Reference can be made to the above-mentioned DE, A1, 44 11 628 for a description of the combination sensor.

The period duration of the rpm signal detected by the sensor 18 known per se is an index for the rpm $N_p$ of the primary disc 25. The pulsewidth ratio indicates the axial displacement $X_p$ of the primary disc 25. In the start-up transmission ratio, for example, a pulsewidth ratio of 25% results and a pulsewidth of p75% results in the overdrive transmission ratio.

Figure 2:
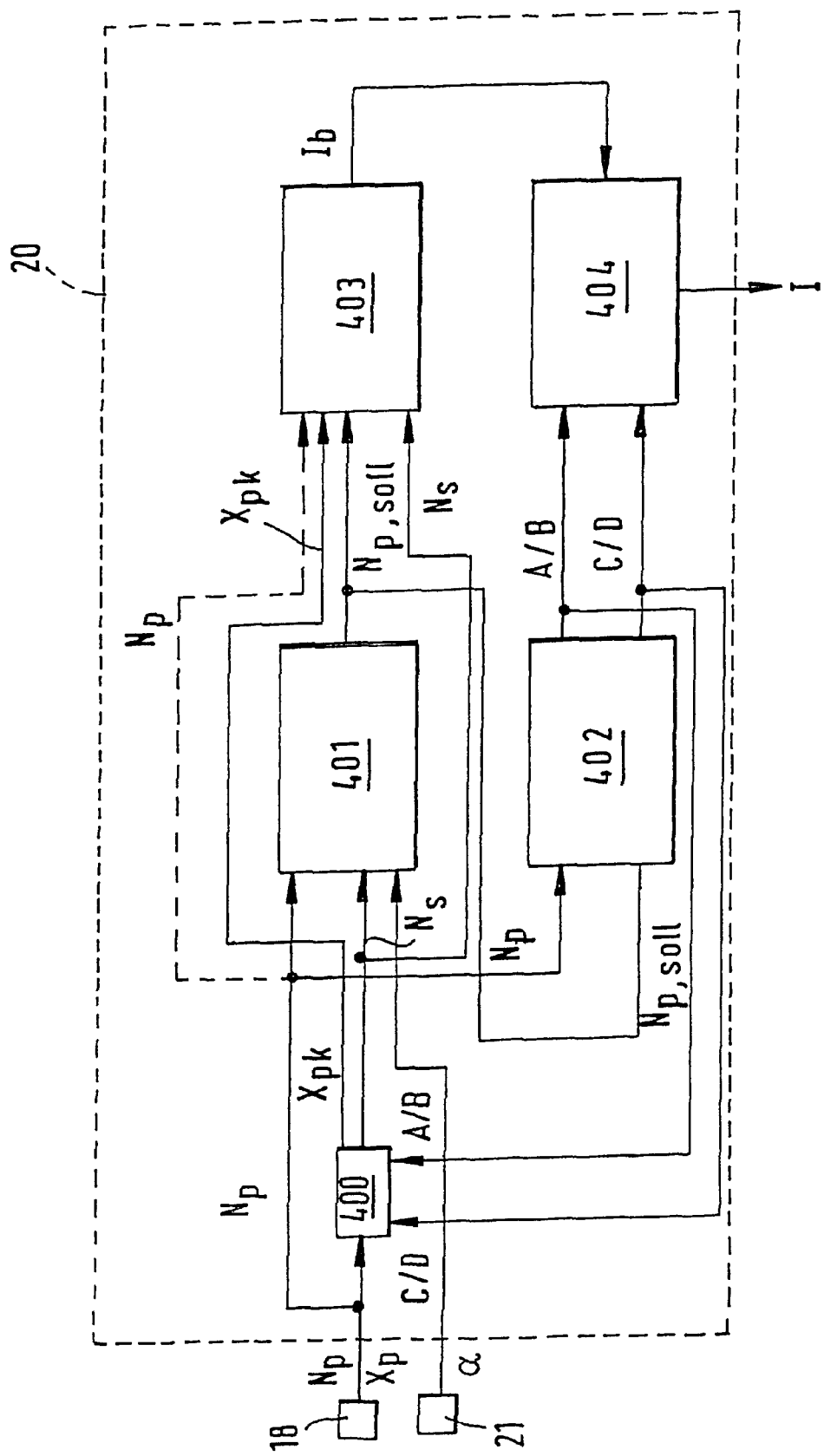
FIG. 2 shows a block diagram of the transmission control of the invention.

The primary or axial displacement signal $N_p/X_p$ is supplied to a transmission control apparatus 20 which adjusts the current I through the magnet 16 of the proportional valve 15. Furthermore, a sensor 21 is, for example, connected for determining the position a of the accelerator pedal actuated by the driver. FIG. 2 shows the configuration of the control apparatus 20 in greater detail.

Figure 5:
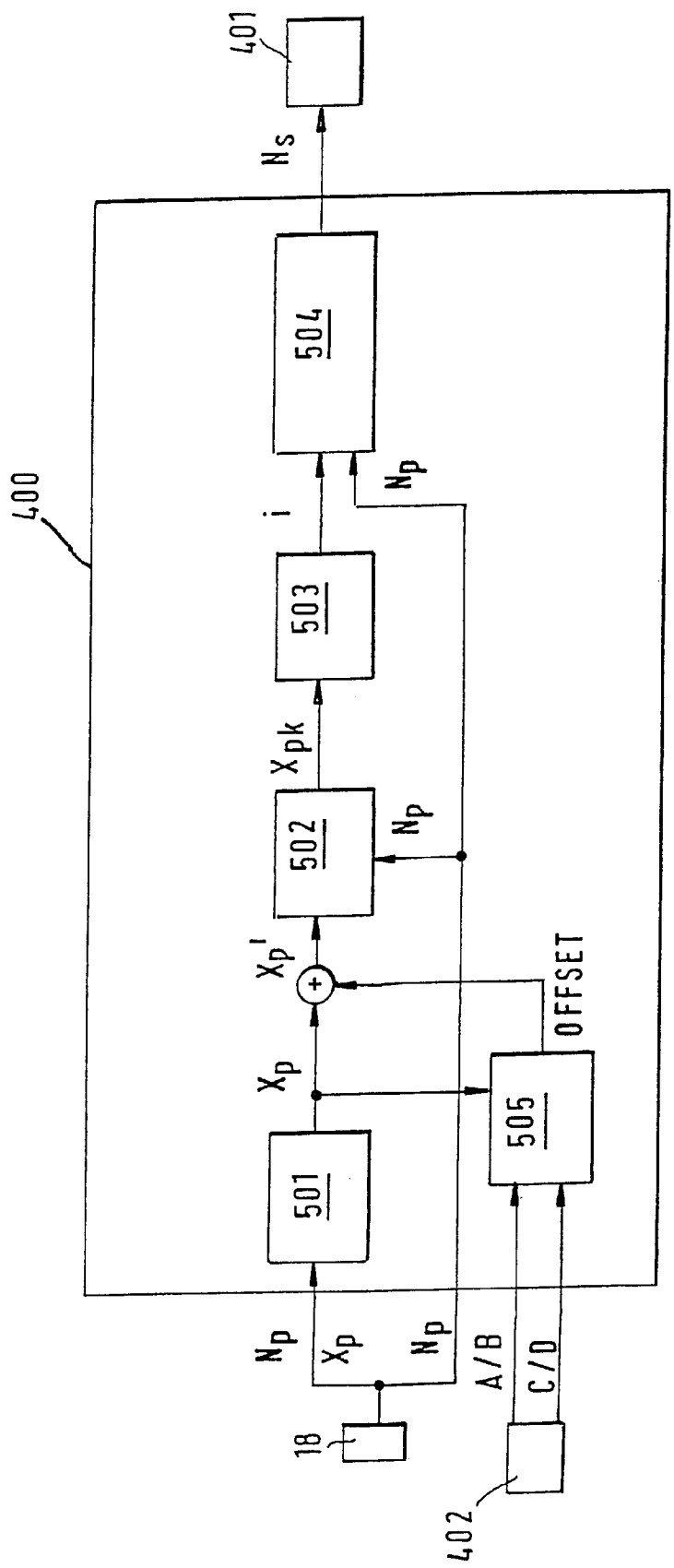

With respect to FIG. 5, the block, which is identified in FIG. 2 with reference numeral 400, is described in greater detail. First, the control apparatus 20 computes in block 400 or in block 501 the axial displacement $X_p$ of the primary disc 25 from the pulsewidth ratio of the output signal of the sensor 18. The axial displacement $X_p$ is corrected with the offset value OFFSET to the value $X_p'$. The offset value OFFSET is formed in the block 505. As will be explained in greater detail with respect to FIG. 3, the status signals A/B and C/D from block 402 are supplied to block 505 for this purpose.

In block 502, the primary rpm $N_p$ is compared to a pregivable small threshold value. The value $X_{pk}$ is outputted in dependence upon the comparator result. When the primary rpm $N_p$ is less than the threshold value, then the corrected axial displacement $X_p'$ is set to a fixed value $X_{low}$ ($X_{pk}=X_{low}$) which corresponds to the axial displacement of the start-up transmission ratio; otherwise, the value $X_p'$ remains unchanged ($X_{pk}=X_p'$). With the function of block 502, it is ensured that always the lowest transmission ratio is adjusted in the start-up region (low engine rpm $N_p$ or primary rpm).

The transmission ratio i is computed or determined in block 503 from the axial displacement value $X_{pk}$. For this purpose, especially a characteristic line is provided.

The secondary rpm $N_s$, that is, the rpm of the output end (secondary) conical disc unit 8 is computed in block 504 with the equation:

$$N_s = N_p/i$$

from the so computed transmission ratio i and the primary rpm $N_p$. This secondary rpm $N_s$ is, in turn, an index for the vehicle longitudinal speed. The secondary rpm $N_s$ is supplied to the block 401.

Figure 3:
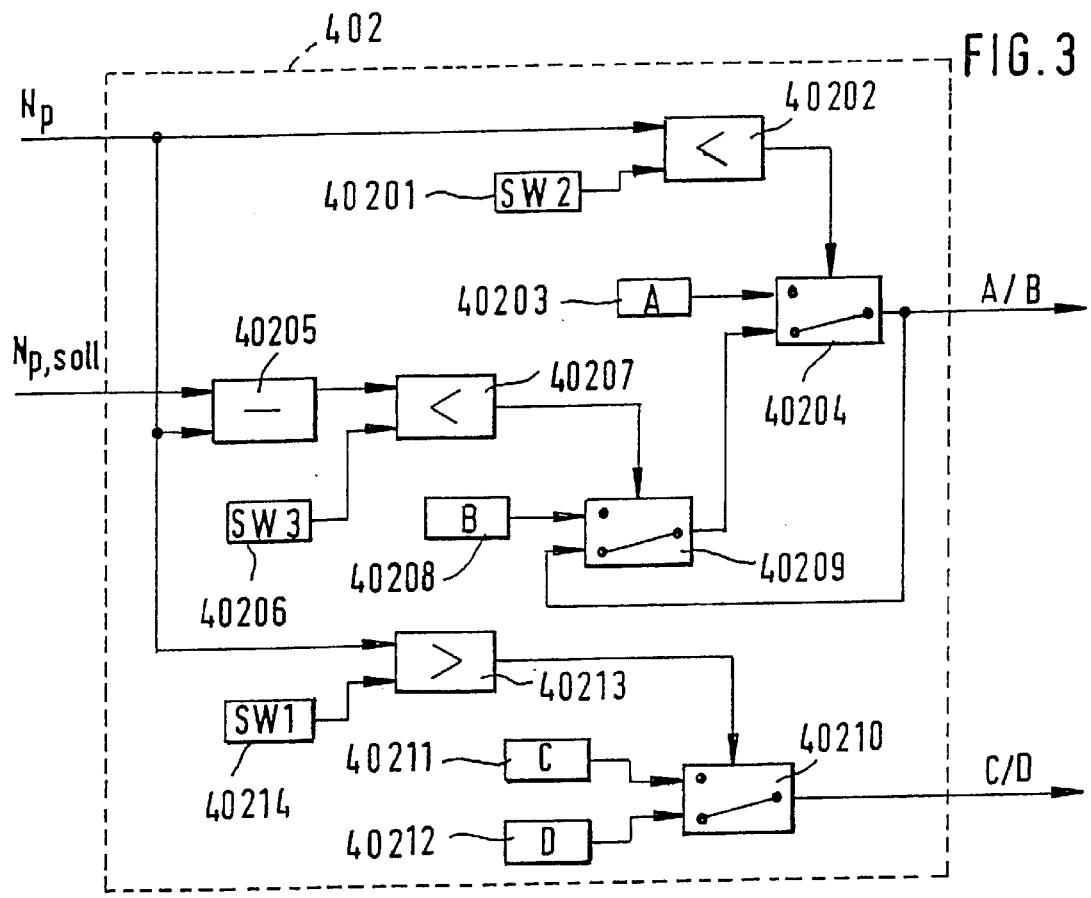
FIGS. 3, 4, 5 and 6 show individual parts of the transmission control shown in FIG. 2 with respect to individual block diagrams.

The precise formation of the status or condition signals A/B and C/D in block 402 is described with respect to FIG. 3. For this purpose, the instantaneously present primary rpm $N_p$ (sensor 18) and the corresponding desired value $N_{p,des}$ are supplied to the block 402. The desired value $N_{p,des}$ is formed in block 401 which is described below with respect to FIG. 2.

The block 402 forms a first status signal A/B which can assume either the value A or the value B and a second status signal C/D which can assume either the value C or D. The first status signal is then set to the value A when the instantaneous primary rpm $N_p$ is less than a threshold value SW2. This takes place via the threshold value storage 40201 by means of the comparison 40202. The switch 40204 is switched over in dependence upon the comparison 40202 in such a manner that the signal value A (40203) is present at the output end of the second computing unit 402.

In block 40205, the difference of the instantaneous primary rpm $N_p$ and the desired primary rpm $N_{p,des}$ is formed and a comparison to threshold value SW3 (40206) is made in block 40207. If the difference, which is formed in block 40205, drops below the threshold value SW3, then the switch 40209 is switched over to the value B (40208). If, at the same time, the instantaneous primary rpm $N_p$ exceeds the threshold value SW2 (see 40202), then the switch 40204 is connected to the switch 40209 as shown in FIG. 2. When the primary rpm $N_p$ is greater than the threshold value SW2 and, at the same time, the difference between the desired primary rpm $N_{p,des}$ and the primary rpm $N_p$ is less than a threshold value SW3,then the first status signal is set to the value B.

The second status signal is set to the value C when the primary rpm $N_p$ is greater than a threshold value SW1 (40214). The threshold value comparator 40213 and the switch 40210 or the memories 40211 or 40212 serve this purpose. If the primary rpm $N_p$ does not exceed the threshold value SW1,then the second status signal is set to the value D.

With start-up, the transmission ratio controller sequentially reaches different operating modes. For standstill of the vehicle, the transmission ratio controller is in the operating mode "ratio hold", that is, the status signals applied to block 505 (FIG. 5) have the values A and D. This operating mode is characterized in that the primary valve 15 (FIG. 1) is closed. This means that no hydraulic oil can flow into the oil chamber 11 of the primary disc or can flow away therefrom. In this way, the adjusted transmission ratio does not change.

The operating mode "ratio low" is adjusted when the vehicle travels with a low speed. The status signals at block 505 (FIG. 5) have then the values A and C. In this operating mode, the primary valve 15 clears a small opening cross section to the hydraulic reservoir. This means that some hydraulic oil can flow out of the primary end chamber 11.

When the vehicle is accelerated further, then the desired and actual primary rpms ($N_{p,des}$, $N_p$) become equal. With the desired and actual primary rpms being equal, the transmission ratio controller switches into the operating mode "control" wherein the status signals on block 505 (FIG. 5) then have the values B and C. In this operating mode, the primary valve 15 is adjusted in dependence upon a comparison between the desired and actual primary rpms ($N_{p,des}$, $N_p$) or between desired and actual axial displacements ($X_{p,des}$, $X_{pk}$) as will be shown with respect to blocks 403 and 404 which are yet to be described.

When the operating mode "ratio low" is active, then the primary valve 15 accordingly adjusts the transmission ratio to larger values until the maximum possible transmission ratio is reached which is limited by mechanical stops.

In this case (reaching the mechanical stops in the operating mode "ratio low"), the pulsewidth of the output signal of the sensor 18 would be minimal. The axial shift for the highest transmission ratio is known. For this reason, an adaptation of the measured pulsewidth signal to the axial shift can be undertaken via an adaptation of the corrective value OFFSET. In this way, tolerances of the assembled position of the sensor 18, that is a transducer wheel 27 (sleeve, FIG. 7) can be compensated during the running operation.

The above adaptation of the pulsewidth signal defines only one variation. Further embodiments of the adaptation are listed below:

an adaptation of the corrective value OFFSET during rolling or during braking of the vehicle can take place for the highest transmission ratio via a detection of the mechanical stop. Reaching the mechanical end stop for the largest transmission ratio can be detected in such a manner that the transmission ratio does not become greater notwithstanding a primary valve 15 (position A) which is opened in the direction of the tank.

The detection of the end stop for the largest transmission ratio can take place via a measurement of the hydraulic pressure at the primary end. The transmission is at the end stop when the vehicle is not at standstill and the primary pressure is zero.

The adaptation of the corrective value can also take place during driving in the overdrive transmission ratio. When the vehicle rolls out (throttle flap opening a has a small value) and the transmission ratio can no longer be reduced, then the end stop for the overdrive transmission ratio is detected.

The detection of the end stop for the smallest transmission ratio can take place via a measurement of the hydraulic pressure at the primary end. The end stop for the overdrive transmission ratio is detected when the primary pressure is a maximum and/or the primary valve to the pump 13 is open (position C) and the transmission ratio can no longer be reduced.

FIG. 2 shows the configuration of the total control Hi apparatus 20 in greater detail. The input signals are processed in block 400 and described with respect to FIG. 5. After block 400, a block 401 is provided in the control apparatus which computes a desired primary rpm $N_{p,des}$ based on an algorithm or determined from a characteristic field from the signals primary rpm $N_p$ (sensor 18), secondary rpm $N_s$ (output signal of block 400), accelerator pedal position a (sensor 21) and, if required, further signals (not shown) for influencing the driving program.

Figure 4:
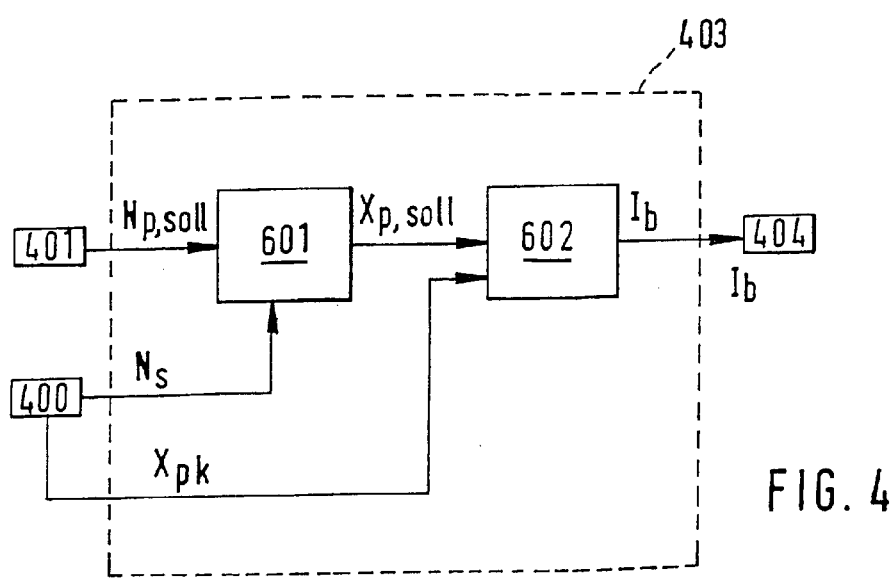

In addition to the secondary rpm $N_s$ determined in block 400 and the axial displacement $X_{pk}$ determined in block 400, the desired primary rpm $N_{p,des}$ is supplied to block 403 described with respect to FIG. 4.

FIG. 4 shows the more precise configuration of block 403 of the transmission ratio controller. The desired primary rpm $N_{p,des}$ (from block 401) is converted in block 601 with the aid of the secondary rpm $N_s$ into a desired axial displacement $X_{p,des}$. The secondary rpm $N_s$ is determined fin block 400.

The desired axial displacement $X_{p,des}$ is compared to the measured axial displacement $X_{p,k}$ in block 602 and a (preliminary) position signal Ib is obtained for the primary valve 15. For this purpose, the usual algorithms for position control of hydraulic cylinders are used.

In known transmission ratio controls, the actuating signal of the primary valve 15 is obtained from a comparison of the desired primary rpm with the actual primary rpm. In contrast, for the embodiment shown in FIG. 4, the desired primary rpm $N_{p,des}$ is first used as a desired quantity. The actual control of the transmission ratio by the corresponding drive of the primary valve, however, relates to the control of the axial displacement. This has the following advantage.

Vibrations of the drive train often occur during kick-down maneuvers (accelerator pedal is pressed far downwardly). With these vibrations of the drive train, short-term oscillations of the drive signal for the primary valve can occur in known transmission controls (actuating signal of the primary valve 15 dependent upon a comparison of the desired primary rpm to the actual primary rpm). In the embodiment suggested in FIG. 4, the oscillation amplitude of the actuating signal can be significantly reduced.

A further advantage is that the slip of the belt means 9 (slip between band and the primary and/or secondary discs) has no influence on the transmission ratio control because here only the primary rpm is used. The transmission ratio control is therefore, in total, more independent of the load acting in the drive train.

As already mentioned and as an alternative to the advantageous embodiment shown in FIG. 4, even the instantaneously present primary rpm value $N_p$ (sensor 18) can be supplied to the block 403. In this case, the block 403 determines a drive signal Ib for driving the magnet 16 in such a manner that, in accordance to a pregiven strategy, the instantaneous primary rpm $N_p$ is brought close to the corresponding desired value $N_{p,des}$.

In the transmission control 20 shown in FIG. 2, the drive signal Ib is processed further in the block 404 to the actual drive signal I for the primary valve or for the magnet 16 in accordance with the invention. For this further processing, the status signals from the block 402 are supplied to block 404 and these signals can assume the signal value A or B and the signal value C or D. The block 402 has already been described with respect to FIG. 3.

As already mentioned, the desired primary rpm $N_p$ des together with the actual primary rpm $N_p$ is computed in block 403 (FIG. 2) to a current value Ib for the drive of the magnetic valve in correspondence to a specific opening cross section of the primary valve 15. The current value Ib computed in this manner is supplied to the block 404, together with the primary and secondary status signals. The block 404 supplies the final drive signal I for the magnet 16 of the proportional valve 15, that is, it determines the position and therefore the opening cross section of valve 15.

Figure 6:
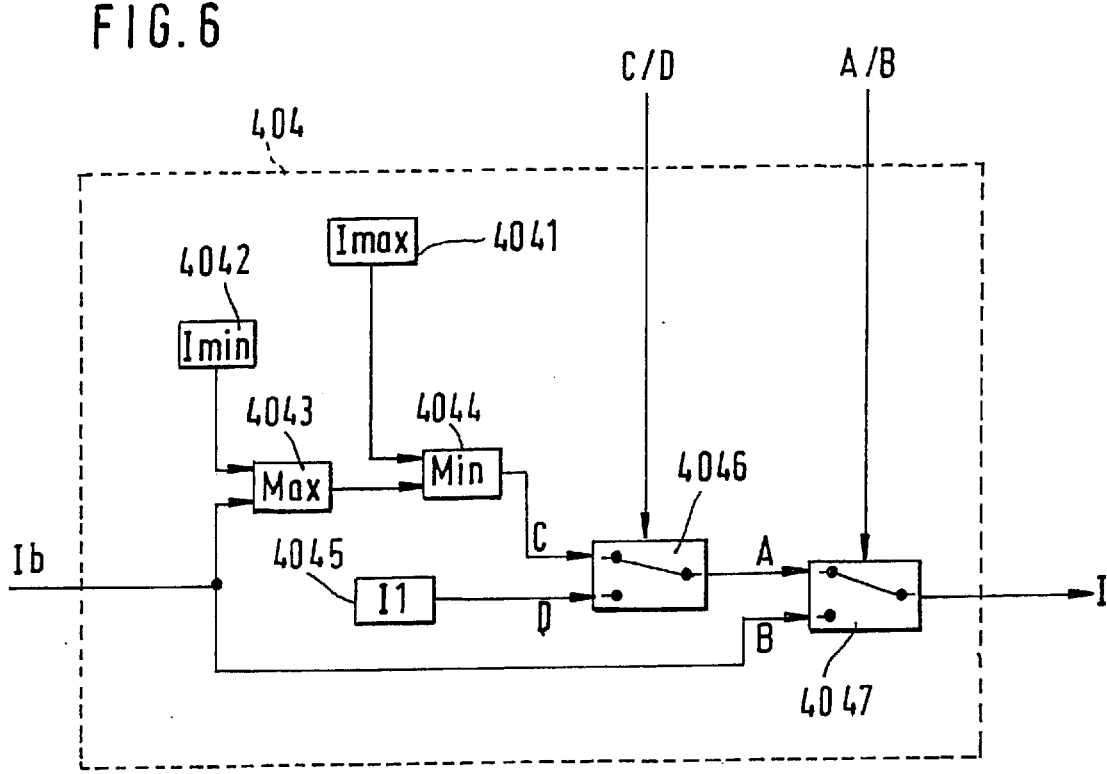

The block 404 is shown in FIG. 6. When the first status signal has the value A and the second status signal has the value D, then the current signal I is set to a value I1 (4045) for which the proportional valve 15 is closed. In this case, the instantaneously adjusted transmission ratio remains constant. The setting of the current signal to the value I1 takes place via a corresponding drive of the switches 4047 and 4046. This means that no change of the transmission ratio takes place when the instantaneous primary rpm drops below the threshold value SW1 as well as below the threshold value SW2.

When the first status signal has the value A and the second status signal has the value C, then the signal Ib coming from the block 403 is limited to an adjustable minimum value (4042) or an adjustable maximum value (4041). This limiting takes place via the maximum selection 4043 or the minimum selection 4044. That is, that in the case wherein:
the primary rpm is greater than the threshold value SW1 and less than the threshold value SW2 or
the primary rpm is greater than the threshold value SW1 and the difference between the desired primary rpm and the primary rpm is greater than the threshold value SW3, the transmission ratio is changed with limited speed.

The signal Ib, which comes from block 403, is not limited when the first status signal has the value B which is achieved by flipping the switch 4047. That is, the transmission gear ratio is rapidly adjusted when the primary rpm exceeds the threshold value SW2 and the difference between the desired value $N_{p,des}$ and the actual value $N_p$ of the primary rpm is not too great.

The control apparatus 20 has a unit for adjusting the current through the magnet 16 in correspondence to the desired current I.

While the embodiment shown proceeds from the common detection of the axial displacement and the rpm at the drive end of the transmission, it can also be provided to undertake this common detection at the output end. The further processing to the drive signal for the transmission ratio adjustment takes place then in the same manner.

The computed values for the transmission ratio i (block 503) and the secondary rpm $N_s$ (block 504) can furthermore be used for other transmission control functions such as for the control of the belt tension as known per se.

If the axial displacement and the primary rpm are detected in common, then the advantage is afforded compared to the computation of the transmission ratio from the primary and the second rpms that the transmission ratio can already be measured for very low driving speeds because the primary discs rotate faster than the secondary discs in the start-up transmission ratio. The more precise measurement of the rpm is more difficult with an rpm which becomes lower.

Furthermore, a secondary rpm sensor must cover a very large measurement range, for example, up to approximately 12,000 rpm. In contrast, the primary rpm sensor must, in general, detect only a measuring range of up to approximately 6,000 rpm. Especially when starting up and braking a vehicle, advantages result via the suggested measuring principle because the adjustment of the transmission ratio is precisely possible already at lower transmission ratios.

The advantages of the invention can be summarized as follows:
only a single sensor is needed for the detection of the primary rpm or the secondary rpm. The second rpm sensor, which is used in the state of the art, is not needed.

The transmission ratio determination for low vehicle speeds is more precise than in the state of the art.

The tolerances during the measurement of the axial displacement are compensated by different adaptation possibilities.

The transmission ratio adjustment is substantially independent of the belt slip and therefore independent of torque fluctuations in the drive train, the transmission ratio adjustment is therefore substantially independent of load.

I claim:

1. An arrangement for adjusting the transmission ratio of a continuously variable belt transmission having a drive end and an output end, each of said ends having at least one axially displaceable element which has essentially the form of a conical disc, the arrangement comprising:

sensor means for detecting an rpm signal ($N_p$) representing the rotational movement of said drive end or of the output end and for detecting a displacement signal ($X_p$), which represents the axial displacement of said at least one element which can be axially displaced;

means for adjusting the transmission ratio with the adjustment taking place at least in dependence upon the detected displacement signal ($X_p$); and, said adjusting means for adjusting said transmission ratio being so configured that:

(a) a corrective value (offset) is determined in dependence upon a displacement signal, which is detected when a pregivable status of the transmission is present; and, (b) the detected displacement signal ($X_p$) and/or quantities ($X_p'$) derived from the detected displacement signal are modified in dependence upon the determined corrective value (offset).

2. The arrangement of claim 1, wherein the pregivable status can be recognized as being present when it is detected that the transmission assumes its maximum or minimum transmission ratio; and, wherein:

(a) at least one valve is actuated for hydraulically displacing the axially displaceable elements and the detection of the maximum or minimum transmission ratio takes place in dependence upon the actuation of at least one valve and/or in dependence upon a detected hydraulic pressure; and/or, (b) the detection of the maximum or minimum transmission ratio takes place in dependence upon a time-dependent change of the detected displacement signal; and/or, (c) the detection of the maximum or minimum transmission ratio takes place in dependence upon the detected position of an accelerator pedal actuable by the driver.

3. The arrangement of claim 1, wherein said adjusting means for adjusting the transmission ratio is so configured that:

(a) the adjustment takes place in dependence upon the detected rpm signal ($N_p$), which represents the rotational movement of the drive end, and in dependence upon the detected displacement signal ($X_p$), which represents the axial displacement of one of the axially displaceable elements mounted on the drive end, wherein it is provided that the adjustment of the transmission ratio takes place without considering a directly sensor-detected rotational movement of the output end; or, (b) the adjustment takes place in dependence upon the detected rpm signal, which represents the rotational movement of the output end, and in dependence upon the detected displacement signal, which represents the axial displacement of one of the elements mounted on the output end so as to be axially displaceable and it is provided that the adjustment of the transmission ratio takes place without consideration of a directly sensor-detected rotational movement of the drive end.

4. The arrangement of claim 1, wherein the sensor means is so configured that the output signal ($N_p/X_p$) of a single sensor 18 is evaluated for detecting the rotational movement and for detecting the axial displacement.

5. The arrangement of claim 1, wherein said means for adjusting the transmission ratio are so configured that (a) the rotational movement of the output end and/or of an actual transmission ratio (i) is dependent upon the detected rpm signal ($N_p$), which represents the rotational movement of the output end, and the detected displacement signal ($X_p$) which represents the axial displacement of one of the axially displaceable elements mounted on the output end; and, (b) the rotational movement of the drive end and/or the actual transmission ratio (i) is determined in dependence upon the detected rpm signal, which represents the rotational movement of the output end, and the detected displacement signal, which represents the axial displacement of one of the axially displaceable elements mounted on the output end.

6. The arrangement of claim 1, wherein said means for adjusting the transmission ratio are so configured that the adjustment of the transmission ratio takes place via a control of the displacement of the axially displaceable elements to a determined desired value ($X_{p,des}$) and, it is especially provided that the desired value is determined in dependence upon the detected displacement signal ($X_p$) and in dependence upon the detected rotational movement ($N_p$).

7. The arrangement of claim 1, wherein said means for adjusting the transmission ratio is so configured that the adjustment of the transmission ratio takes place via a control of the displacement of the axially displaceable elements to a determined desired value ($X_{p,des}$) wherein:

(a) the rotational movement ($N_s$) of the output end is determined from the detected displacement signal ($X_p$) of the drive end and the detected rpm signal ($N_p$) of the drive end;

(b) a desired value ($N_{p,des}$) for the rotational movement of the drive end is formed from the detected rpm signal ($N_p$) of the drive end, the determined rotational movement ($N_s$) of the output end, and a detected position ($\alpha$) of the accelerator pedal actuable by the driver; and, (c) a desired value, ($X_{p,des}$) for the displacement for the axially displaceable elements is determined in dependence upon the determined desired value ($N_{p,des}$) for the rotational movement of the drive end and the detected rpm signal ($N_p$) of the drive end.

8. A method for adjusting the transmission ratio of a continuously adjustable belt transmission having a drive end and an output end which have at least one axially displaceable element, which has essentially the form of a conical disc for which an rpm signal ($N_p$) is detached, which represents the rotational movement of the drive end or the output end, the method comprising the steps of:

detecting a displacement signal ($X_p$) which represents the axial displacement of at least one of the axially displaceable elements;

causing the adjustment to take place at least in dependence upon the detected displacement signal ($X_p$); and, configuring said adjusting means for adjusting said transmission ratio so that:
(a) a corrective value (offset) is determined in dependence upon a displacement signal, which is detected when a pregivable status of the transmission is present; and,
(b) the detected displacement signal ($X_p$) and/or the quantities $X_p'$ derived from the detected displacement signal are modified in dependence upon the determined corrective value (offset).

* * * * *

UNITED STATES PATENT AND TRADEMARK OFFICE
CERTIFICATE OF CORRECTION

PATENT NO. : 6,086,507  
DATED : July 11, 2000  
INVENTOR(S) : Joachim Luh

Page 1 of 1

It is certified that error appears in the above-identified patent and that said Letters Patent is hereby corrected as shown below:

Column 4,
Line 30, delete "S".
Line 46, delete "p75%" and substitute -- 75% -- therefor.
Line 52, delete "a" and substitute -- $\alpha$ -- therefor.

Column 5,
Line 11, delete "20".

Column 6,
Line 52, delete "a" and substitute -- $\alpha$ -- therefor.
Line 63, delete "Hi".

Column 7,
Line 4, delete "a" and substitute -- $\alpha$ -- therefor.
Line 14, delete "fin" and substitute -- in -- therefor.
Line 60, delete "$N_p$ des" and substitute -- $N_{p,des}$ -- therefor.

Column 10,
Line 10, delete "18".
Line 18, delete "$(X_p)$" and substitute -- $(X_p)$, -- therefor.
Line 32, delete "especially".
Line 40, delete "$(X_{p,des})$" and substitute -- $(X_{p,des})$; -- therefor.
Line 51, delete "value," and substitute -- value -- therefor.
Line 60, delete "detached," and substitute -- detected, -- therefor.

Column 12,
Line 2, delete "$X_p'$ " and substitute -- $(X_p')$ -- therefor.

Signed and Sealed this

Twelfth Day of March, 2002

*Attest:*

*Attesting Officer*

JAMES E. ROGAN
*Director of the United States Patent and Trademark Office*